Patented Jan. 8, 1946

2,392,732

UNITED STATES PATENT OFFICE 2,392,732

COATING MATERIALS

Howard L. Gerhart, Milwaukee, Wis., assignor to Pittsburgh Plate Glass Company, Allegheny County, Pa., a corporation of Pennsylvania No Drawing. Application March 14, 1940, Serial No. 323,944

9 Claims. (Cl. 260—5)

The present invention relates to compositions useful as varnishes or coatings for various objects, and it has particular relation to a composition including as its main film-forming constituent certain artificial resins obtained by polymerization of cyclodiene hydrocarbons.

One object of the invention is to provide a coating composition of diene, the resin of which possesses air-drying properties.

A second object of the invention is to provide a coating composition of the foregoing type which is substantially free from wrinkling.

A third object is to provide a resin composition which after drying is hard, durable, resistant to solvents, resistant to alkalies and acids, and strongly adherent to metals, such as iron or steel.

These and other objects of the invention will be apparent from consideration of the following specification and claims.

In my copending application Serial No. 324,392, filed March 16, 1940, and entitled "Resinous materials," the preparation of artificial resin bodies by polymerization of cyclopentadiene under suitable conditions is described. The process involves as one feature the heating to about 30 to 60° C. of a 40 to 70% cyclopentadiene in a solvent such as xylol, toluol, chlorinated hydrocarbon, etc., and in the presence of a catalyst such as 1 or 2% of dihydroxy-fluoboric acid or of ferric chloride, or other halide of an amphoteric metal. Polymerization is induced, and a resin which is suitable for casting or for molding under heat and pressure or for grinding to provide a molding powder is obtained. It is also miscible with various volatile solvents including petroleum hydrocarbons or hydrogenated or chlorinated petroleum hydrocarbon thinners. This resin is characterized by a high degree of stability, has an iodine number of 200 or 300 and possesses air-drying properties, so that when films thereof are exposed to the atmosphere they soon harden to a firm, durable state, in which they resist acids, alkalies and do not tend to decompose spontaneously into powders. This setting up or hardening may be accelerated by baking at a temperature of around 300° F. The dried resins are chemically resistant and adhere relatively firmly and permanently to metals, wood and various other materials.

The present invention relates to the provision of varnishes or enamels and other coating compositions suitable for application by brushing, spraying, etc., from the foregoing resins. Improved cyclopentadiene resins that can be used in the practice of the present invention are obtained by one of the methods described in my copending application above mentioned. By way of example, that involved in the use of dihydroxy fluoboric acid as a catalyst will be described as follows:

To a solution consisting of a mixture of 1 part by weight of cyclopentadiene and one part by volume of an inert hydrocarbon such as benzol, toluol, petroleum, hydrogenated petroleum or chlorinated hydrocarbons, is added no more than 1/60 part by volume of dihydroxy fluoboric acid at 35° C. The solution is stirred to produce intimate mixture of the catalyst and cyclopentadiene. After about 3 to 5 minutes, the temperature will rise to 50, then to 60 and perhaps to 80° C. If cooling is provided, the temperature may not rise about 50° C. The liquid will thicken as the polycyclopentadiene forms and will assume a dark brown appearance. If the amount of catalyst used is not excessive, about 50 to 70 per cent of the theoretical amount of resin will be formed. If the cooling means is very efficient, the temperature may not rise above 50° C. and the amount of resin formed is decreased. After the cooling means is removed, the temperature will rise from 50° to as high as 80° C. if permitted, or it may be caused to do so rapidly by adding more catalyst and mixing.

An infinite number of temperature conditions and catalyst concentrations can be used in the reaction but in general it is desirable to keep the first peak of the temperature rise at 50–60° C. so as to prevent a profuse boiling of the cyclopentadiene. This is accomplished by cooling. On the second temperature rise, which starts after the cooling bath is removed or when more catalyst is added, the peak may go as high as 120° C. but it is preferred to limit it to 80° C. by cooling. This latter temperature rise is desirable, however, and it is preferred to heat the resin solution after the polymerization is substantially complete to effect a final "cure."

The resultant resin solution may be treated with alcohol, acetone, or the like to precipitate the resin. The solvent can also be removed by evaporation if desired. Treatment of the resin solution with alcohol or acetone results in the removal of all or most of the catalyst employed. The resultant resin may likewise be treated with a basic substance to precipitate or inactivate the catalyst and remove at least a part of the color of the resin solution at this point. Thus ammonia gas may be passed into the solution or organic bases such as morpholine, triamyl, amine, diethyl amine, etc. may be added.

The resultant resin, when free of active catalysts, may be dissolved in a hydrocarbon solvent such as xylol, toluol and hydrogenated petroleum solvents, in amounts to obtain desired consistency for application to surfaces by brushing, spraying, or other methods. Compounding ingredients, such as pigments, may be added. Plasticizers, such as amyl, or diamyl naphthalate dimethoxy tetraethylene glycol, triethylene glycol, dihexoate in appropriate amounts (e. g. 10 to 20% more or less based on resin content) may be added along with conventional cobaltic, lead or manganese driers.

The following constitute examples of paste-like compositions which may be diluted at will with thinners to provide enamels or varnishes embraced within the purview of the present invention:

Example I.—Red

| | Parts |
|---|---|
| Polycyclo resin | 100 |
| Red pigment (p-toluidine red) | 60 |
| Xylol | 100 |

Example II.—Aluminum

| | | |
|---|---|---|
| Polycyclo resin | parts | 14 |
| Xylol | do | 2 |
| Aluminum powder | do | 2½ | or

| | | |
|---|---|---|
| Polycyclo resin | parts | 7 |
| Cumar resin cut (50% solution in xylol) | do | 7 |
| Xylol | ozs | 2 |
| Aluminum powder | ozs | 2½ |

Example III.—Orange

| | Parts |
|---|---|
| Chrome yellow dark pigment | 220 |
| Polycyclopentadiene resin | 100 |
| Petroleum fraction (boiling point: 100–160° C.) | 75 |

In these examples, the term "polycyclo resin" refers to a 60% solution of the resin dissolved in a hydrocarbon thinner such as a coal tar, petroleum or hydrogenated petroleum thinner. The pastes are made by grinding the ingredients in the well known manner until the desired degree of subdivision is obtained. It is unnecessary to grind the aluminum paste.

The enamels are prepared for use by mixing the paste with polycyclo resin solution and thinning to the desired consistency. For example, the orange paste (Example III) was compounded to obtain the following constituency:

6.5 parts (volume) orange paste
40 cc. (volume) polycyclo resin
20 parts petroleum thinner The thinners may be suitably chosen to impart the desired volatility characteristics to the enamels. One boiling away at 300° F. within a period of one half hour is satisfactory. In general, any hydrocarbon thinners or chlorinated hydrocarbons of adequate volatility are satisfactory.

Other resins in amounts of 5 to 40%, based on resin content, may be used in conjunction with the polycyclo resin. Such resins are polystyrol, polyindene, cumar resins, polymerized rubber, and the hydrocarbon resins in general. Thus it is found that the addition of cumar resins enhances the leafing properties of the aluminum enamels without detracting from the characteristics of the polycyclo resin. Ester gum and soluble Bakelite type gums may be blended with the polycyclo resins in these enamels if desired. Polymerization of the cyclopentadiene may be effected in the presence of a vegetable oil to obtain a product that may be either a copolymer of cyclopentadiene and the oil, or a mixture of polymerized cyclopentadiene and bodied oil, or mixtures of all three. Products so obtained may be admixed with simple cyclopentadiene resin and/or simple vegetable oil to provide useful coating materials.

Any unsaturated vegetable oil can be used; also any product in which a vegetable oil is present in some degree of combination such as in the alkyd resins or varnishes. The following charges illustrate some of the mixtures which were polymerized with stannic chloride at 50° C. average reaction temperature. The resultant resins may be incorporated with thinners and other compounding ingredients in accordance with Examples I–III, or in any other suitable formula to provide coating compositions.

Example IV

| | | |
|---|---|---|
| Cyclopentadiene | grams | 60.5 |
| Xylol | cc | 61 |
| Linseed or China-wood oil | cc | 90 |

Example V

| | | |
|---|---|---|
| Cyclopentadiene | grams | 50 |
| Xylol | cc | 65 |
| Perilla oil, soya oil or oiticica oil | cc | 5 |

Example VI

| | | |
|---|---|---|
| Cyclopentadiene | grams | 20 |
| Soya oil | cc | 100 |

The product of this reaction is compatible with vegetable oils.

Example VII

| | | |
|---|---|---|
| Cyclopentadiene | grams | 50 |
| Linseed acids | cc | 5 |
| Xylol | cc | 65 |

Example VIII

| | | |
|---|---|---|
| Linseed, ester gum varnish | cc | 50 |
| Cyclopentadiene | grams | 50 |
| Xylol | cc | 10 |

The varnish comprises 12½% ester gum, 35½% oil and 52% thinner.

Example IX

| | | |
|---|---|---|
| Cyclopentadiene | cc | 3850 |
| Soya bean oil | cc | 475 |
| Xylol | cc | 2875 |

Example X

| | | |
|---|---|---|
| Cyclopentadiene | cc | 3400 |
| Corn oil | cc | 450 |
| Xylol | cc | 2600 |

In the formulae the glyceride oils may be replaced by corresponding free fatty acids or varying amounts of free fatty acids may be incorporated with the glyceride oils used in the reaction.

It is possible to prepare a co-polymer of cyclopentadiene and the vegetable oil molecule or a polymer of cyclopentadiene which includes the vegetable oil molecule using any ratio of vegetable oil to cyclopentadiene. Such polymers are compatible with resin or oil depending upon which predominates and oils may be used interchangeably. This procedure affords a new means of incorporating hydrocarbons with vegetable oils.

It may be possible to use these oil resins to prepare varnishes in the usual manner by heating with gums and more (e. g. 5 to 40% on solids content) of oil. The oils impart flexibility to the resin.

A large number of oil concentrations have been found useful; also a large variety of oils and combinations of oils have been used to obtain varnish compositions with multifarious properties. In General, the drying oils produce harder enamels but semi and non-drying oils can be used successfully. The oils may be natural, acid or alkali refined, heat bodied, blown oils or dehydrated oils.

A quick drying resin from soya bean oil is formed by the conjoint polymerization of 2370 cc. cyclopentadiene and 5180 cc. of alkali refined bodied soya bean oil in 3520 cc. of petroleum thinner. 350 grams of the above resin was ground with 258 grams lithopone and 362 grams calcium base titanox, to produce an excellent white wall paint.

Desired vehicles are formed by combining vegetable oils with the resins in Examples IV to VIII. A product of conjoint heating of cyclopentadiene and a vegetable oil under polymerizing conditions, as above described, may be blended in an amount of for example 25 to 75% of the simple cyclopentadiene resin to obtain useful coating materials that can be dissolved in a solvent and spread in conventional manner.

Cyclopentadiene can also be polymerized in an excess of drying oil such as linseed oil, to provide a liquid product which with or without a diluent can be used for coating purposes.

The oil modified resin may be incorporated in any desired proportion with polymers of rubber obtained by treating rubber in solution with tin tetrachloride. Rubber polymers of this type are sold under the trade name of "Pliolite."

The enamels may be applied to surfaces in any desired manner such as by brushing, spraying, dipping, or flowing. The resins, by reason of their drying characteristics, show a tendency, when applied as heavy coatings, to harden at the surface, while the interior of the film remains fluid. Wrinkling of the film results. Accordingly, when the enamels are to be used as air-drying coatings, it is generally recommended that there be added 5 to 20% of certain "anti-wrinkling agents" which may also have at least a temporary plasticizing effect on the coating. Such materials are zinc naphthenate, diphenyl amine, cresylic acid, p-tert-amyl phenol and certain substances containing the ether linkage, e. g. dimethoxy tetraglycol, amyl tolyl ether, p-dimethoxy benzene; triethylene glycol diisobutyrate and triethylene glycol dicaprylate, triethylene glycol heptoate, diethylene glycol dipropionate, triethylene glycol butyrate caprylate, diethylene glycol cocoanut oil acid, triethylene glycol ester of acids resulting from oxidation of petroleum hydrocarbons, o-amyl phenol (inhibits drying) diethylene glycol dibenzoate, amyl tolyl ether, amyl xylyl ether and butyl phenyl ether.

Wrinkling may be prevented by using with the above "anti-wrinkling" plasticers some solvent of a terpenic origin such as dipentene. This solvent is also useful to give smooth flow and prevent wrinkling, when used without the above agents, a preferred formula will contain from 10 to 25% dipentene, turpentine pinene, etc., based on the total thinner content.

Driers, such as lead, manganese or cobalt oleates or similar heavy metal soaps, may be added in appropriate amounts along with the anti-wrinkling agents.

It is observed that each of the "anti-wrinkling plasticizers" contains an oxygen ether linkage. The inhibition of wrinkling is not due entirely to the plasticizing action of the addendum because some of the compounds are relatively low boiling and may not remain in the film.

The following non-wrinkling material was prepared:

| | Parts |
|---|---|
| Cyclopentadiene resin (50% solution in toluol) | 100 |
| Triethylene glycol diisobutyrate | 10 |
| Xylol | 40 |

Films of this resin solution will set up within ½ hour to be tack-free and adhere well to the panels. In six hours the films harden so as to be comparable to a mar-resistant varnish with excellent adhesion to surfaces of metals, such as iron, steel, aluminum, etc. After overnight drying, the films can not be softened by rubbing with hydrocarbon thinners or active lacquer thinners.

The following type of plasticized resin solution was used as a wood sealer and surfacer:

| | | |
|---|---|---|
| Cyclopentadiene resin (50% solution in toluol) | parts | 30 |
| Talc | do | 10 |
| Dimethoxy tetraglycol | cc | 3 |

This sealer dried hard overnight on maple wood. A similar formulation gives a film which sands well after 20 hours drying:

| | | |
|---|---|---|
| Cyclopentadiene resin (50% solution in toluol) | grams | 24.0 |
| Zinc stearate | do | 3.0 |
| Dimethoxy tetraglycol | do | 2.7 |
| Toluol | gals | 4.0 |

Air-drying lacquers formulated with these "anti-wrinkling agents" were used successfully as dipping lacquers.

The films are characterized by a strong adhesion to metals and other surfaces, and excellent resistance to solvents and chemicals. The films have a relatively short set-up time and the completely cured film is characterized by mar-proofness and insolubility in thinners, even those in which the resin was originally soluble. The films are especially resistant to acids and alkalies.

The forms of the invention herein shown and described are to be considered merely as exemplary. Numerous modifications may be made therein without departure from the spirit of the invention or the scope of the following claims.

What I claim is:

1. A coating composition comprising a volatile hydrocarbon solvent in which is dissolved a resinous co-polymer of cyclopentadiene and a drying oil.

2. A coating composition as defined in claim 1 in which the coating composition further contains an additional hydrocarbon resin.

3. A coating composition comprising a volatile hydrocarbon solvent having dissolved therein a resinous co-polymer of cyclopentadiene and a drying oil and further containing polymerized rubber.

4. A coating composition suitable for spreading upon surfaces to form protective films said composition comprising a volatile hydrocarbon solvent, a resinous polymer of cyclopentadiene dissolved therein, said polymer being stable on exposure to the atmosphere, the composition further comprising cumar resin and aluminum powder.

5. A coating composition comprising a hydrocarbon solvent, a resinous co-polymer of cyclopentadiene and a drying oil, and further containing dissolved drying oil.

6. A coating composition comprising a solution of drying oil and a copolymer of cyclopentadiene and a glyceride of a fatty acid.

7. A coating composition comprising a solution in an organic solvent of a resinous polymerization product obtained by polymerizing cyclopentadiene in a glyceride of fatty acid.

8. A coating composition comprising a resinous material obtained by polymerizing cyclopentadiene in a semidrying vegetable oil, said material being dissolved in a solvent.

9. A coating composition comprising a resinous material obtained by polymerizing cyclopentadiene in a non-drying glyceride oil, said material being dissolved in a solvent.

HOWARD L. GERHART.